(12) United States Patent
Redecker et al.

(10) Patent No.: US 7,289,873 B2
(45) Date of Patent: Oct. 30, 2007

(54) SENSOR SYSTEM FOR A CUTTING MACHINE TOOL

(75) Inventors: Volker Redecker, Bispingen (DE); Dirk Lange, Lüneburg (DE); Jan-Wilm Brinkhaus, Hannover (DE)

(73) Assignee: Artis GRS. fur angewandte Messtechnik mbH, Bispingen-Behringen (DE)

( * ) Notice: Subject to any disclaimer, the term of this patent is extended or adjusted under 35 U.S.C. 154(b) by 0 days.

(21) Appl. No.: 11/252,378

(22) Filed: Oct. 18, 2005

(65) Prior Publication Data

US 2006/0085092 A1    Apr. 20, 2006

(30) Foreign Application Priority Data

Oct. 20, 2004    (DE)    .................. 10 2004 051 145.4

(51) Int. Cl.
*G06F 19/00* (2006.01)
(52) U.S. Cl. .................. 700/174; 73/1.82; 307/104; 340/310.17
(58) Field of Classification Search .................. 700/90, 700/159, 174; 73/1.82, 1.84, 660; 340/310.17; 307/104
See application file for complete search history.

(56) References Cited

U.S. PATENT DOCUMENTS

| | | | | |
|---|---|---|---|---|
| 5,663,504 A | | 9/1997 | Kluft | |
| 5,831,348 A | * | 11/1998 | Nishizawa | ................... 307/104 |
| 5,869,910 A | * | 2/1999 | Colens | ................... 307/104 |
| 6,265,791 B1 | * | 7/2001 | Eberl et al. | ................... 307/104 |
| 6,462,432 B1 | * | 10/2002 | Seelig et al. | ................... 307/33 |
| 6,597,076 B2 | | 7/2003 | Scheible | |
| 7,131,791 B2 | * | 11/2006 | Whittaker et al. | ....... 405/184.2 |

FOREIGN PATENT DOCUMENTS

| | | |
|---|---|---|
| DE | 3922556 A1 | 1/1991 |
| DE | 44 32 808 A1 | 3/1995 |
| DE | 19917626 A1 | 10/2000 |
| DE | 199 26 799 A1 | 12/2000 |
| DE | 101 50 128 A1 | 4/2003 |
| DE | 101 63 734 A1 | 7/2003 |
| GB | 2037995 A | 7/1980 |

* cited by examiner

*Primary Examiner*—Leo Picard
*Assistant Examiner*—Douglas S Lee
(74) *Attorney, Agent, or Firm*—Raymond R. Ferrera

(57) ABSTRACT

The present invention relates to a sensor system for a cutting machine tool (300) with an energy supply unit (101), which inductively provides energy for the supply of at least one sensor arrangement (110) of the cutting machine tool (300) out of a magnetic alternating field (B), at least one sensor arrangement which measures a force, appearing within the cutting machine tool (300) and/or a torque and/or the body sound within the cutting machine tool, and a data transmitting unit (120), which wirelessly transmits data, which relate to a value, which is measured by the at least one sensor arrangement (110) of the cutting machine tool (300).

19 Claims, 4 Drawing Sheets

SENSOR SYSTEM FOR A CUTTING MACHINE TOOL

STATEMENT OF RELATED CASES

Pursuant to 35 U.S.C. 119(a), the instant application claims priority to prior German application number 10 2004 051 145.4, filed Oct. 20, 2004.

FIELD OF THE INVENTION

The present invention relates to a sensor system for a cutting machine tool and a machine tool of this kind which is provided with a sensor system.

BACKGROUND OF THE INVENTION

Modern cutting machine tools perform more and more complex and tedious machining processes after a single programming. The more the human steps into the background during this provision of such processes, the more the machine tool must be able to control itself. Therefore, typically, sensors are arranged within or at the machine tool in which a data transmission as well as the energy transmission is done via cables. These cables are either directly guided to the sensors or to inductive transmission devices at immediate spatial proximity. By means of such sensors, the control of the machine tool or a controlling system connected thereto controls process conditions, for example drilling or milling of a metal, and reacts in an appropriate way on deviations with respect to a predetermined process behavior.

The integration of sensors and control modules into cutting machine tools is difficult: Many measuring points are not easy to access and comprise small sizes. However, the main difficulty is the fact that the parts to be controlled of a cutting machine tool, for example drills or milling cutters, rotate. Therefore, often a control of secondary values is performed. Instead of a measuring of the torque of a drill, for example auxiliarily the energy consumption of the driving motor is measured. Such measuring of secondary values is suitable for some use cases, however they are often inexact. A measuring possibly directly at the site of action is desirable.

From the DE 199 26 799 A1, it is known to use a distance sensor within an industrial robot or the like, which is provided with electrical energy by means of a magnetic field, which is generated by a primary coil, and which sends out radio signals about the information which is measured by the sensor. Besides the distance sensor, the DE 199 26 799 A1 comprises an exclusive list of other possible sensors which work according to this principle, namely temperature sensors, pressure measuring sensors, current measuring sensors or voltage measuring sensors. A hint on cutting machine tools and requirements in combination with the work steps of drilling and milling to a controlling sensor electronics cannot be retrieved from the DE 199 26 799 A1. This applies also for the DE 101 50 128 A1, which discloses a similar sensor system.

However, wireless sensor systems for cutting machine tools are known from the DE 44 32 808 A1 and the DE 101 63 734 A1. The DE 44 32 808 A1 discloses a system which is capable of transmitting sensor signals of a sensor which is directly connected to the secondary coil of a transformer-like arrangement, via transformer like coupling. Thereby, secondary voltages arise, which are generated out of the measured signal without preprocessing and which can be measured on the primary side. This system allows the use of sensors at not easily accessible or rotating elements of cutting machine tools, for example the shaft of a drill or a milling cutter. It, however, does not provide a solution for sensor electronics which are not directly connectible to an inductive transmission link. This includes particularly the nowadays common strain gauges by which normal forces and torques at shafts of a cutting machine tool are measured.

The DE 101 63 734 A1 describes a system in which the sensors of a cutting machine tool are exposed to a magnetic alternating field to generate the required operation energy. The energy generation functions according to the transformer principle. The energy-generating coil thereby forms the primary coil and the coil of the sensor electronics provides the secondary coil. The transmission of the data measured by the sensors at the machine tool happens by means of load modulation of the introduced magnetic alternating field by the sensor electronics. At an appropriate orientation of the primary and the secondary coil, the induction effect and the signal transmission is not influenced by a rotation of the area to be measured, such that this method is particularly useful for the control of cutting machine tools. Since only one single secondary coil is needed within the machine tool, the disclosed system can be realized particularly space-saving and it can therefore be integrated into the area of the small receptacles for the common tools of a cutting machine tool, for example a single drill or a milling cutter.

However, this method in practice comprises a series of disadvantages:

As a frequency of the magnetic alternating field, which simultaneously transmits the energy for the sensor electronics and the data, in general the range up to 125 kHz is used. This frequency range is purposeful for the effective energy transmitting since in the proximity of metals, magnetic alternating fields are attenuated by circular fields and this effect increases at higher frequencies. To transmit as much energy as possible, it is therefore common to stay in the range up to 125 kHz. The data transmission rate of a transmission link depends mainly on the frequency of the carrier wave and can be in every case only a fraction of it. The method according to the DE 101 63 734 A1 therefore leads to data rates of approximately 4 kBaud at carrier waves of 125 kHz. Therefore, the information provided by the sensor electronics is heavily limited in its extent as well as in its actuality.

Further, the transmission of data from the sensor electronics to the energy-consuming unit decreases the energy which the sensor can generate from the field which surrounds the sensor, since its field strength must be varied by principle. As a result, either the data or the energy amount is thereby limited which can be transmitted from respectively to the sensor electronics.

If more sensor electronics' are provided at a cutting machine tool, they have to share the maximum usable data rate. Therefore, the already limited data rate further decreases.

Finally, systems, which use an inductive energy transmitting, must introduce high energy amounts into the primary coil due to dispersion effects, particularly if high distances of energy transmitting are needed, for example due to construction reasons. The higher the energy amounts are, the more difficult it will be to extract the load modulation from a sensor from its input signal. Therefore, as a result, at the systems according to the DE 101 63 734 A1 only limited distances can be achieved.

It is therefore the problem of the present invention to provide a sensor system for a cutting machine tool which overcomes the above-mentioned disadvantages of the prior art and particularly allows higher data rates for the transmission of the values received by the sensor systems and allows large distances and thereby considers the peculiarities and requirements of a cutting machine tool.

SUMMARY OF THE INVENTION

The present invention solves this problem by the provision of a sensor system for a cutting machine tool with an energy-supply unit which inductively provides energy for the supply of at least one sensor arrangement of the cutting machine tool out of a magnetic alternating field, at least one sensor arrangement, which measures a force appearing within a cutting machine tool and/or a torque and/or the body sound within a cutting machine tool, and a data transmitting unit which wirelessly transmits data, which relate to a value which is measured by the at least one sensor arrangement of the cutting machine tool. Against the teaching of the above-described prior art of the sensor electronics of cutting machine tools, the applicant for the first time figured out that the function of the energy supply on the one hand and the wireless data transmission of the measured information on the other hand can be separated from each other due to the increasing miniaturization of the measuring electronics and sensor electronics for the measuring of a force, a torque and/or the body sound also within a cutting machine tool with compact rotating components. Since, therefore, the wireless data transmission is independent from the magnetic alternating field of the energy supply, a significantly higher data transmission rate can be achieved, even if the usable bandwidth has to be shared for a plurality of sensor arrangements. As a result, more measuring values can be transmitted in shorter time periods. This is particularly of importance if the measuring values are immediately fed back into the control of the cutting machine tool and thereby allow a more precise manufacturing of a work piece.

Further, more energy can be used by the sensor arrangement compared to systems according to the prior art, since the energy supplying magnetic alternating field can be operated at an operating point, which is optimal for the energy transmission. Modulation of the field for the data transmission is no longer necessary. As a result, the sensor arrangement can be provided with energy over a distance of a plurality of meters. This provides significantly larger possibilities for the arrangement of one or more sensor arrangements at the machine tool, compared to measuring units of the prior art.

As a result, therefore a sensor system is provided, which does not need an own energy supply, allows a dynamic coupling of controlling sensors within a cutting machine tool, facilitates structural alterations of sensors within existing systems and allows a receptacle of a plurality of the mentioned physical values close to the operation.

The magnetic alternating field and the data transmission preferably use different frequencies, wherein the frequency of the magnetic alternating field preferably amounts $\leq 125$ kHz and wherein the frequency of the data transmission preferably amounts $> 125$ kHz and particularly preferred lies within the MHz range, particularly in the range of $\geq 10$ MHz. The two frequencies can therefore be optimized for each particular purpose of use (energy transmission, respectively data transmission).

Preferably, the sensor system further comprises a data receiving unit to allow a bidirectional data transmission from and to the sensor system. Thereby, for example the adjustment for the amplifying, for setting the zero point of one or a plurality of filters, the sample rate and the analyzing of signal peaks of one or more sensors of the sensor arrangement can be set by parameters.

Preferably, the sensor system further comprises an energy receiving unit for the receptacle of the data transmitted by the data-transmitting unit, which preferably provides an interface for the control of the cutting machine tool. The operation parameters of the cutting machine tool, for example number of rotations and speed of a drill, can therefore automatically react to the values received by the sensor system.

In an actually particularly preferred embodiment of the invention, the sensor system further comprises a processor, which controls the functions of the energy supply unit and/or the sensor arrangement and/or the data transmitting unit. Further, preferably a memory with instructions for the processor is provided. It is particularly preferred that the instructions for the processor can be updated via the data receiving unit. Therefore, the sensor system can be flexibly adapted to the most different requirements. The above-mentioned sensor arrangement preferably comprises one or more of the following sensors: At least one strain gauge for measuring of a torque and/or a force, an acceleration sensor, a sensor for body sound and/or airborne sound, particularly on the basis of a piezo-electric element, and a temperature sensor, particularly on the basis of a semiconductor and/or on the basis of the measuring of an electric resistance.

Further, the sensor system preferably comprises a generating unit for the magnetic alternating field, wherein the generating unit preferably comprises a pair of coils.

Further, the sensor system in one embodiment uses a plurality of sensor arrangements, which are arranged at different positions of one or more cutting machine tools. Different to the known sensor systems of cutting machine tools therefore at a plurality of different positions of one or more machine tools, measuring values can be measured and used as feed back signals for the control of the machine(s) if needed.

Further developments of a sensor system according to the invention are described in the additional dependent claims.

According to a further aspect, the present invention relates to a cutting machine tool with one of the above-described sensor systems.

BRIEF DESCRIPTION OF THE DRAWINGS

In the following, aspects of the present invention are described in more detail with reference to the accompanying drawings. The figures show.

DETAILED DESCRIPTION OF THE DRAWINGS

In the following, actually preferred embodiments of the sensor system according to the invention are described in more detail by means of sensor modules for a cutting machine tool.

Figure 1:
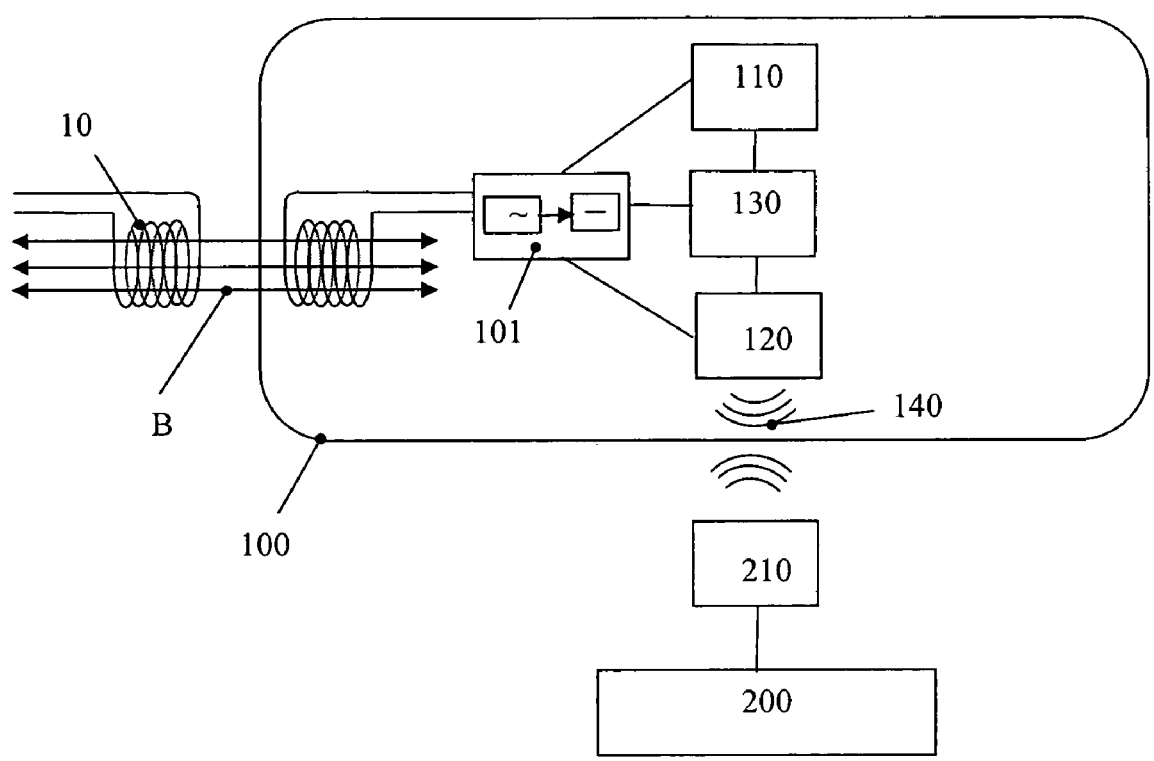
FIG. 1 is a schematic overall view of different components of an embodiment of the present invention.

FIG. 1 shows a schematic overall view of components of the sensor system in a first preferred embodiment for a description of the basic principle.

A primary coil 10 generates a magnetic alternating field B at a frequency of preferably up to 125 kHz. Particularly preferred is a frequency range of 10 kHz to 125 kHz.

The alternating field B acts for the operation of one or more sensor modules 100. Within the sensor module 100, a supply voltage for the different components of the sensor module 100 is generated by means of a power supply unit 101 out of the alternating field B. In the embodiment, which is simplified shown in FIG. 1, these are the sensor arrangement 110, a radio interface 120 and a converting circuit, which can be provided as a micro-controller 130.

The sensor arrangement 110, whose possible construction is described below, provides one or more measuring values, which are transmitted to the micro-controller 130. The microcontroller 130 transmits the stored and/or converted (if necessary) data by means of the radio interface 120 via electromagnetic radio waves 130 to the radio interface 210 of a receiving device 200. This device can likewise be connected to the machine controller or a control device of the cutting machine tool, which communicates with the controller to provide a feedback to the machine tool (not shown in FIG. 1).

Microcontroller 130 is preferably controlled by a firmware which is stored within a memory (not shown) of the sensor module 100. It is particularly preferable if the radio link between the two radio interfaces 120 and 210 is provided bidirectional. Then, the firmware of the microcontroller 130 can be updated from distance by the transmission of appropriate data packets to adapt it to changing requirements, for example if the way of operation of the machine tool, which is controlled by the sensor module 100 was changed in general or if the sensor module is used for another cutting machine tool. This facilitates the modular connection between the sensor module 100 and the controlled machine tool.

For an update of the firmware, it is further conceivable that the control is assigned to a second microcontroller (not shown) on the sensor module 100 on the basis of the data to be transmitted for the firmware update and updates the program memory.

Further, the bi-directional radio link allows that the sensor module 100 does not only transmit data but also receives particular data and processes this data on its own. This is particularly true for general configuration data, which has an influence on the operation behavior. It is particularly reasonable:

to set an amplifying factor from the outside, which determines how strong a measuring signal is amplified before the actual measuring is performed.

to set the parameters for signal filters from the outside. For example, the number of measurings for which internally an averaging of the signals should be performed before the so-determined data are sent as measuring value is reasonable.

to send calibration data to the sensor module 100 from the outside. For example, the instruction to set the zero point of a measuring to the value X of an internally determined measuring data is reasonable.

Further, it is advantageous for some applications if a measuring data memory (not shown) is available on the sensor module 100. The sensor module 100 then can store measuring data over a particular period and perform an analysis of the signals on request. It is also thinkable that the sensor arrangement 110 or the complete sensor module 100 changes particular parameters of its operation on its own on the basis of such a measuring data memory, for example by an adaptation of the zero point and/or the measuring range.

Further, it is thinkable that the sensor arrangement 110 or the complete sensor module 100 performs self-diagnostics to determine defective operation modes. In a first instance, this can be done by self-checks or by the detection and signalization of illogic/impossible measuring value combinations.

Further, it is reasonable if the sensor module 100 records the previous operation time of the machine tool or a part of the machine tool, for example by storing corresponding data in the above-mentioned measuring data. Thereby, the condition "is actually in use" or "is actually not in use" can be extracted from the sensor data.

Figure 2:
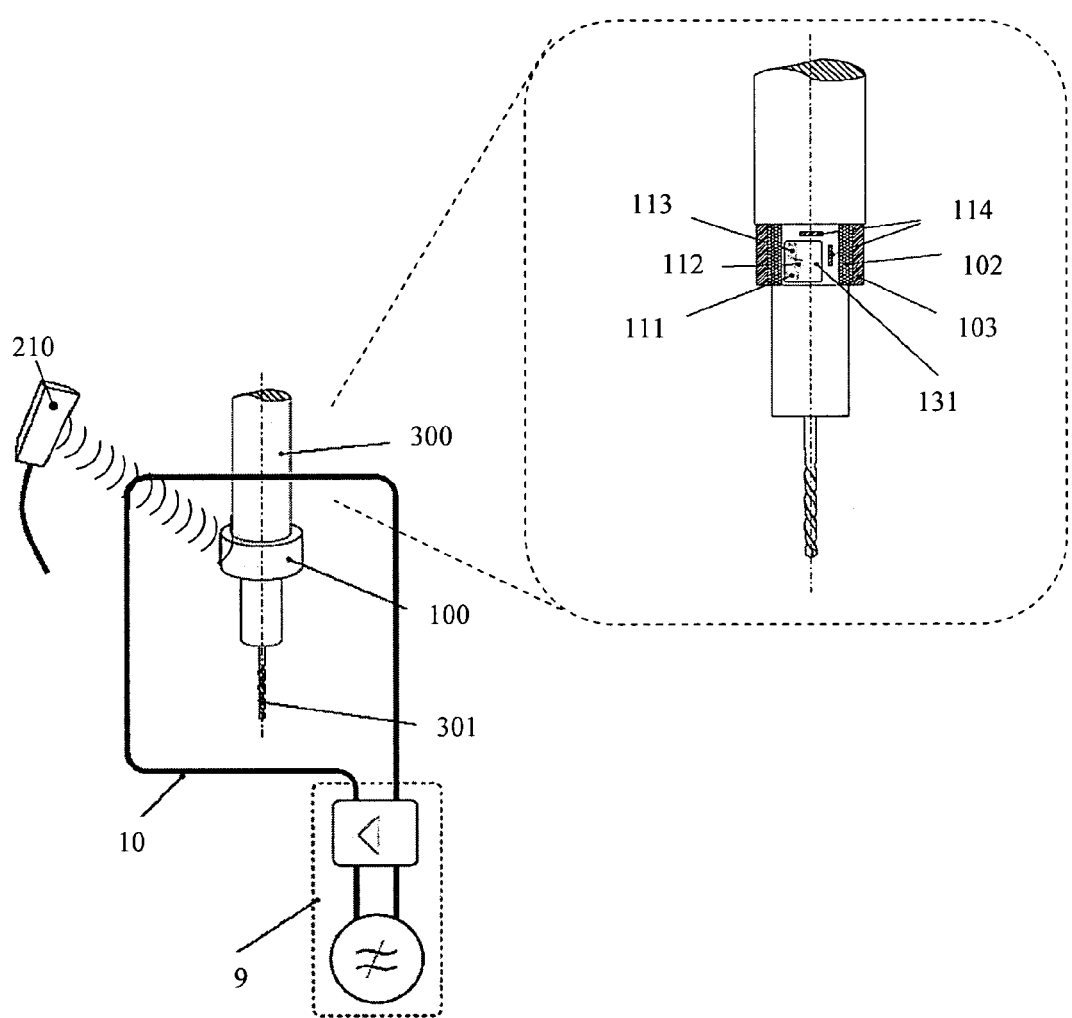
FIG. 2 is an overall view of components in the embodiment of FIG. 1 with a detailed view of the sensors arranged at the cutting machine tool.

FIG. 2 shows a more detailed illustration of the components which are shown in FIG. 1 only schematically. The magnetic field B is generated by a field generator 9 and a field coil 10, such that the field B (not shown) effects onto the cutting machine tool 300 (only shown part-wise in FIG. 2) and particularly on the sensor module 100 arranged thereon. The sensor module 100 delivers measuring values to an operation step performed by the machine tool, for example the actually used torque of the drill 301. The measuring values are processed in modules 100 and transmitted to the antenna 210 by radio communication.

The detailed section in FIG. 2 shows a preferred assembly of the sensor module 100: Around the axis of the drill 301, annularly one or more coils 102 are arranged, in which a current is induced by the outer field B, which is provided by the field generator 9 and the coil 10. By means of the perpendicular arrangement of the coil level with respect to the rotation axis of the drill 301, the induction of current is not influenced by a rotation of the drill. To protect the coils 102 from a damaging, they are potted into an annular element 103. By the selection of an appropriate material of the potted element 103, further the induction of current within the coils 102 can be supported. The outer field coil 10 and the coils 102 are preferably arranged in parallel to each other to achieve a maximum induction.

FIG. 2 schematically shows a plurality of sensors. For example, by means of a sensor 111, body sound can be measured during and out off a machining of a work piece. To this end, preferably piezo-based body sound sensors are used. FIG. 2 further schematically shows a temperature sensor 112, which for example uses semiconductor materials or which measures the resistance which is changing by temperature (for example a commercially available Pt-100 element). Besides this, FIG. 2 also shows an acceleration sensor 113.

Torques and feed-rate forces are preferably measured by one or more strain gauges. Preferably, two strain gauges 114 are used, which are arranged essentially perpendicularly to each other, to measure extensions in several spatial directions. For a reading of the strain gauges, preferably a low pass is generated by connecting the strain gauge with a capacitor (not shown) onto which a pulsed input signal is introduced. By measuring of the time constants of the answering signal at the low pass exit (capacitor), the strain gauge evaluation can be done by a time measuring, which is particularly favorable with respect to the energy consumption of the sensor module 100 and therefore provides additional advantages during a wireless energy supply of the sensor module 100.

In an alternative embodiment (not shown), the strain gauges 114 are connected to measuring bridges within a Wheatstone circuit and its output signal is digitalized either directly or after a signal processing.

Additionally to the schematically shown sensor 111 to 114 of FIG. 2 with further sensors (not shown) for example the airborne sound or other physical values can be examined which are of importance for the cutting machining steps performed by the machine tool 300 to ensure a faultless function.

The signals of the sensors 111 to 114 are led to a processing electronics 131 via a digital or analogue bus (not shown in FIG. 2) which for example may include the above-mentioned microcontroller and the radio interface 120 (not shown in FIG. 2). The electronics 131 is preferably arranged on a flexible printed circuit board or on a segmented printed circuit board to be adaptable to the design of the cutting machine tool 300.

As it is also shown in the left part of FIG. 2, the sensor module 100 generates a radio link to the external antenna 210 by which the processed data are finally transmitted to an evaluation circuit which is not shown in FIG. 2, which if necessary is connected with the controller of the machine tool 300 for a feedback.

Figure 3:
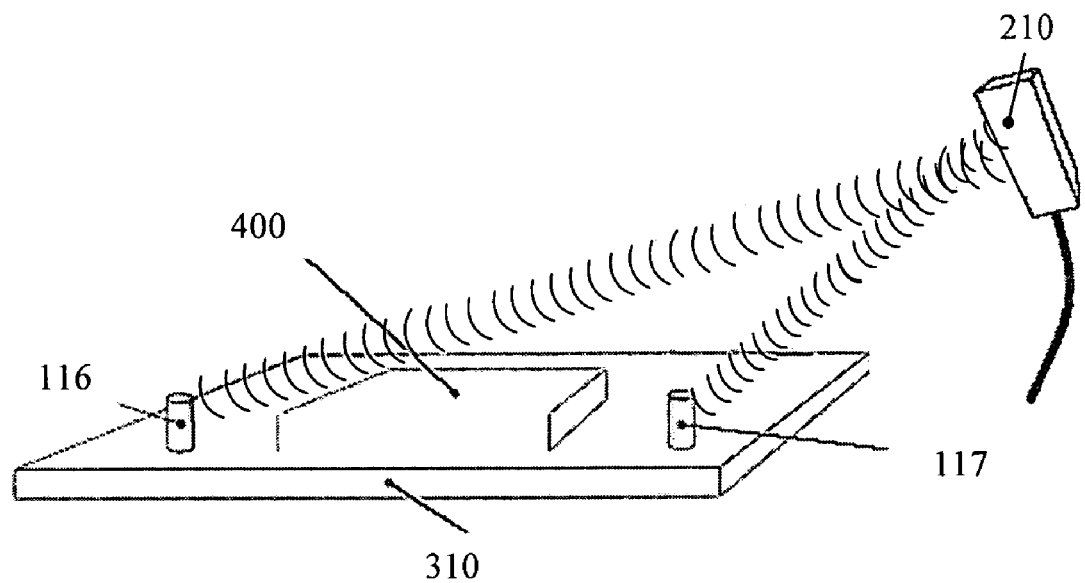
FIG. 3 is a further embodiment with sensors arranged at a work table of a cutting machine tool.
Figure 4:
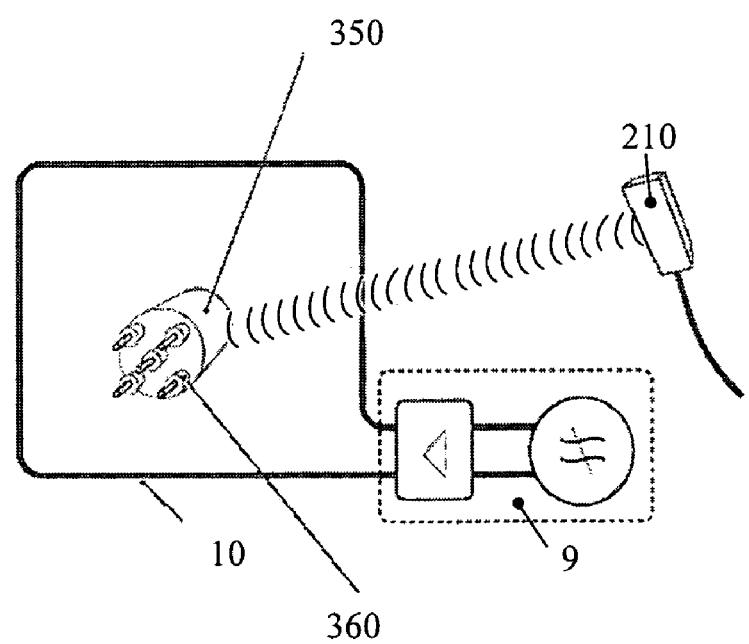
FIG. 4 is a further embodiment with sensors arranged at a multi-spindle drilling head.

FIGS. 3 and 4 show further exemplary arrangements of sensors. So, FIG. 3 shows a working table 310 of a cutting machine tool on which a work piece 400 is located. For a control of the manufacturing processing, a vibration sensor 116 and a body sound sensor 117 are arranged. In FIG. 3, the sensors 116 and 117 are components of two independent sensor modules which both communicate with the antenna 210 via their own radio interfaces (not shown). The energy supply of both sensor modules, however, is done via a commonly used outer alternating field (not shown in FIG. 3). FIG. 4, however, shows an arrangement in which a plurality of tool holders 360 are arranged within a multiple-head drill spindle 350, which each comprise torque sensors, sensors for the feed rate forces and other sensors (not shown), respectively. Since all of these sensors are connected to a common sensor module, all data are transmitted via a common radio link to an antenna 210.

Figure 5:
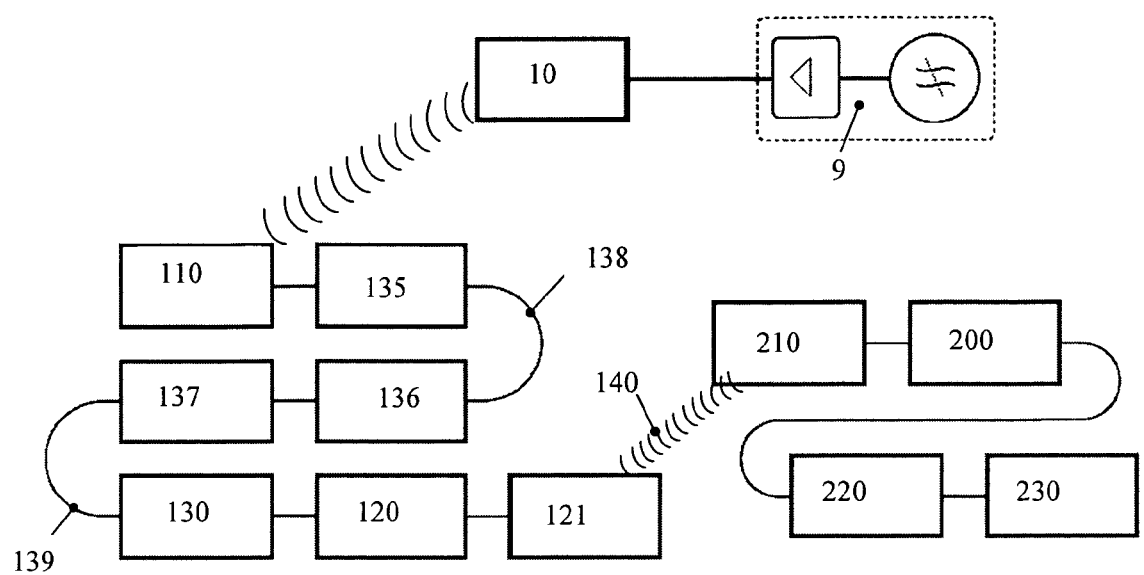
FIG. 5 is a schematic overall view of the way of the signals in the embodiments of FIGS. 1 and 2.

The signal processing of the measuring values in the described embodiment is shown in detail in FIG. 5:

The raw data, generated from the sensor arrangement 110, initially are amplified within an amplifier 135, before they are input into a filter 156 via an analogue data connection 138. After that, within the AD-converter 137, a conversion into digital signals is performed, which are sent to the microcontroller 130 via a digital bus 139. The microcontroller 130 sends the data in an appropriate form and, if necessary, after an intermediate storing to the radio interface 120, which is connected with an antenna 121. Via the digital bus 139 and/or additional connections (not shown), the microcontroller 130 additionally can control the function of preferably all components of the sensor module.

Via a radio link, which operates preferably within a multi-digit MHz range, the data are transmitted to the radio interface 210 of the receiving unit 200. The receiving unit 200 is again connected with a processing unit 220 and a control unit 230, which detects deviations of the measured values from predetermined reference values and outputs appropriate control signals to the controller of the cutting machine tool, if needed.

It is possible to compress the data measured by the sensor arrangement prior to transmission. In such a way, the bandwidth of the transmission can be used in a better way. A conceivable way of compression would be to only transmit the essential properties of the signals (minimum values, maximum values, transition points). This way of data transmission would however be lossy, i.e. the actual run of the measured data can only be regenerated in its basic appearance within the receiving unit 200. Conceivable are also loss-less algorithms with which for example a frequent appearance of similar measuring signals in the data transmission is summed up and designated with a label. Possible is also the use of compression methods, e.g. MPG-1, Part 3.

The above-mentioned run of the signals is only one possibility for the signal processing. For example, the measuring values can also be digitalized directly at the output of the amplifier 135 or even of the sensor arrangement 110, to thereafter arrange a digital filter which for example can be a component of the microprocessor 130. The other way round, the electronics arranged on the sensor module 100 can also operate totally analogue and can transmit the data as analogue radio signals to the receiving unit 200.

In an advanced embodiment (not shown), the sensor module 100 could have an internet address and could allow a data communication via the internet and/or an intranet. By using the TCP/IP protocol, the UDP protocol or any other internet protocol, it would be possible to communicate with the sensor module 100 via the internet or a business intranet. Thereby, the receiving unit 200 and/or the processing unit 220 and/or the control unit 230 have a kind of bridge function, i.e. it receives the TCP/IP packets and transmits the packets or the information contained therein further to the sensor module 100. On the way back of measuring data from the sensor module 100 to the internet/intranet, the same way is conceivable.

Instead or additionally to the internet/intranet connection, the receiving unit 200 and/or the processing units 220 and/or the control unit 230 can provide also an interface for an analogue modem and/or an ISDN connection, to request via this way data from the distance from the sensor module and to send control signals to the sensor modules if needed.

The invention claimed is:

1. Sensor system for a cutting machine tool, comprising:
    a. an energy-supply unit, which provides inductively energy for the supply of at least one sensor arrangement of a cutting machine tool out of a magnetic alternating field;
    b. at least one sensor arrangement, which measures a force, appearing within a cutting machine tool and a torque and the body sound within a cutting machine tool; and
    c. a data transmitting unit which wirelessly transmits data via radio waves, wherein said data are related to a value, which is measured by the at least one sensor arrangement of the cutting machine tool.

2. Sensor system according to claim 1, wherein the magnetic alternating field and the wireless data transmission use different frequencies.

3. Sensor system according to claim 2, wherein the frequency of the magnetic alternating field has a value of $\leq 125$ kHz and wherein the frequency of the wireless data transmission has a value of $\geq 125$ kHz.

4. Sensor system according to claim 3, wherein the frequency of the wireless data transmission is within the MHz range, particularly in the range of $\geq 10$ MHz.

5. Sensor system according to claim 1, further comprising a data receiving unit, to allow a bidirectional data transmission from and to the sensor system.

6. Sensor system according to claim 1, further comprising a receiving unit to receive the data sent from the data transmitting unit.

7. Sensor system according to claim 6, wherein the receiving unit comprises an interface for the control of the cutting machine tool.

8. Sensor system according to claim 6, wherein the receiving unit can set measuring parameters of the sensor arrangement.

9. Sensor system according to claim 1, further comprising a processor, which controls the function of the energy supply unit and the sensor arrangement and the data transmitting unit.

10. Sensor system according to claim 9, further comprising a memory with instructions for the processor.

11. Sensor system according to claim 5, further comprising a processor, which controls the function of the energy supply unit and the sensor arrangement and the data transmitting unit, and a memory with instructions for the processor, wherein the instructions for the processor can be updated via the data receiving unit.

12. Sensor system according to claim 1, wherein the sensor arrangement comprises one or more of the following sensors:
   a. at least one strain gauge for measuring of a torque and a force;
   b. an acceleration sensor;
   c. a sensor for body sound and airborne sound, particularly on the basis of a piezo-electric element;
   d. a temperature sensor particularly on the basis of a semiconductor and on the basis of a measuring of the electric resistance.

13. Sensor system according to claim 12, wherein the at least one strain gauge is connected to a capacitor, to form a low pass for a pulsed input signal.

14. Sensor system according to claim 12, wherein a plurality of strain gauges are connected with each other to a Wheatstone circuit.

15. Sensor system according to claim 12, wherein the electric signals generated from a sensor are digitalized and transmitted to the data transmitting unit via a wired digital bus.

16. Sensor system according to claim 1, further comprising a generating unit for the magnetic alternating field, wherein the generating unit preferably comprises a pair of coils.

17. Sensor system according to claim 12, comprising a plurality of sensor arrangements, which are arranged at different areas of the cutting machine tools.

18. Sensor system according to claim 17, further comprising a plurality of data transmitting units, wherein the plurality of sensor arrangements and the plurality of data transmitting units are provided with energy by means of a common first magnetic alternating field.

19. Cutting machine tool with a sensor system according to one of previous claims 1 to 18.

* * * * *